No. 631,701. Patented Aug. 22, 1899.
C. F. DU BOIS.
AIR COMPRESSOR.
(Application filed Mar. 10, 1899.)

(No Model.) 3 Sheets—Sheet 1.

Witnesses
Inventor
Charles F. Du Bois
By:
Attorneys

No. 631,701. Patented Aug. 22, 1899.
C. F. DU BOIS.
AIR COMPRESSOR.
(Application filed Mar. 10, 1899.)

(No Model.) 3 Sheets—Sheet 2.

Witnesses
James R. Mansfield
William E. Sullivan

Inventor
Charles F. DuBois.
By:
Alexander & Dowell
Attorneys

THE NORRIS PETERS CO., PHOTO-LITHO., WASHINGTON, D. C.

No. 631,701. Patented Aug. 22, 1899.
C. F. DU BOIS.
AIR COMPRESSOR.
(Application filed Mar. 10, 1899.)

(No Model.) 3 Sheets—Sheet 3.

Witnesses
James R. Mansfield
William A. Sullivan

Inventor
Charles F. Du Bois
By
Alexander & Dowell
Attorneys

THE NORRIS PETERS CO., PHOTO-LITHO., WASHINGTON, D. C.

UNITED STATES PATENT OFFICE.

CHARLES FRANKLIN DU BOIS, OF DENVER, COLORADO.

AIR-COMPRESSOR.

SPECIFICATION forming part of Letters Patent No. 631,701, dated August 22, 1899.

Application filed March 10, 1899. Serial No. 708,567. (No model.)

*To all whom it may concern:*

Be it known that I, CHARLES FRANKLIN DU BOIS, of Denver, in the county of Arapahoe and State of Colorado, have invented certain new and useful Improvements in Air-Compressors; and I hereby declare that the following is a full, clear, and exact description thereof, reference being had to the accompanying drawings, which form part of this specification.

This invention is an improvement in rotary air-compressors of a peculiarly-novel type in which the amount of compression of the air may be due to the weight upon a supported part—as, for example, the weight upon a shaft carried by a wheel or the weight of or upon a wheel carried by a shaft.

The invention can be applied to the hub of a bicycle, vehicle, car, engine, or other wheel of moving or stationary apparatus, or to the shaft or axles thereof, or to various machine-bearings, so that the supported weight of said machinery may be utilized to compress air, which air can be utilized in motor, air-engine wheel, or fan for power or stored in a receiver for future use.

The invention therefore consists in the novel constructions and combinations of parts hereinafter claimed, and the accompanying drawings illustrate apparatus embodying my invention, referring to which—

Figure 1:
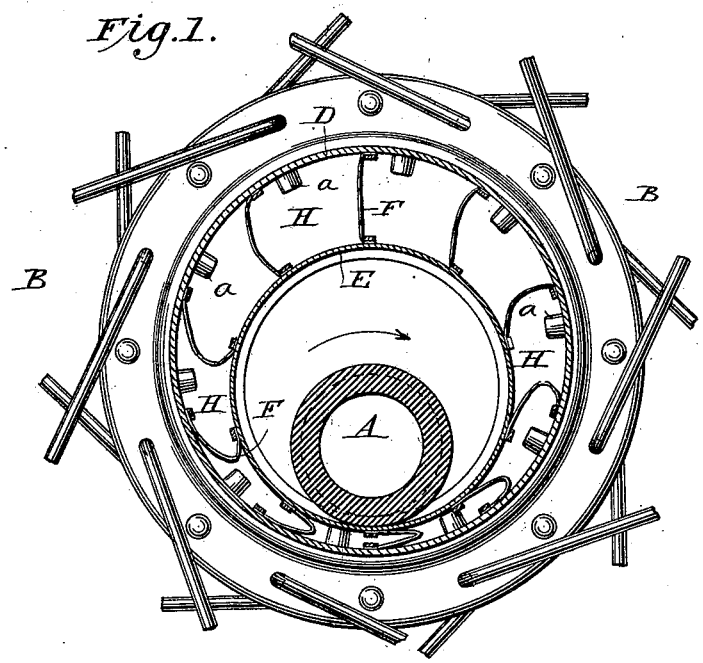
Figure 2:
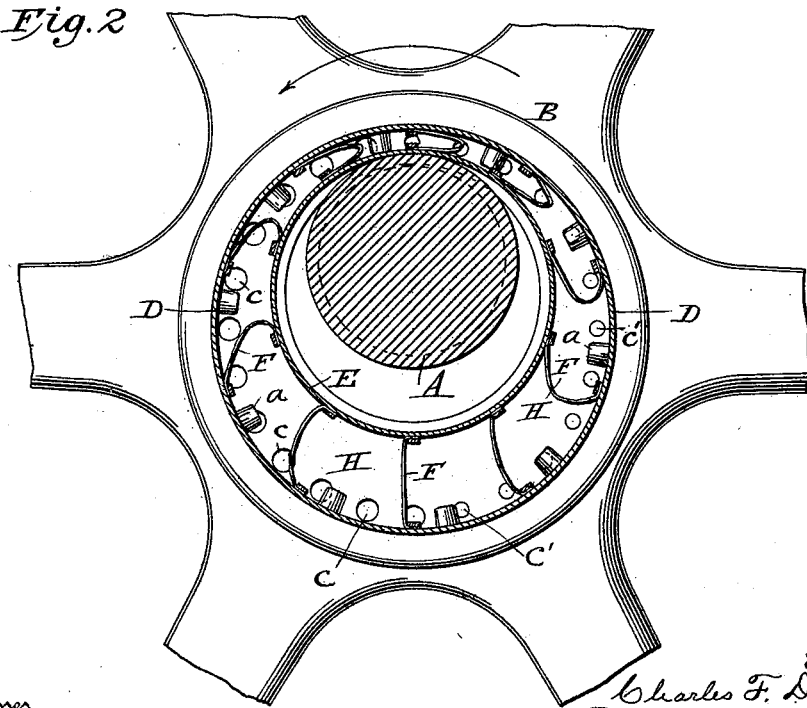
Figure 3:
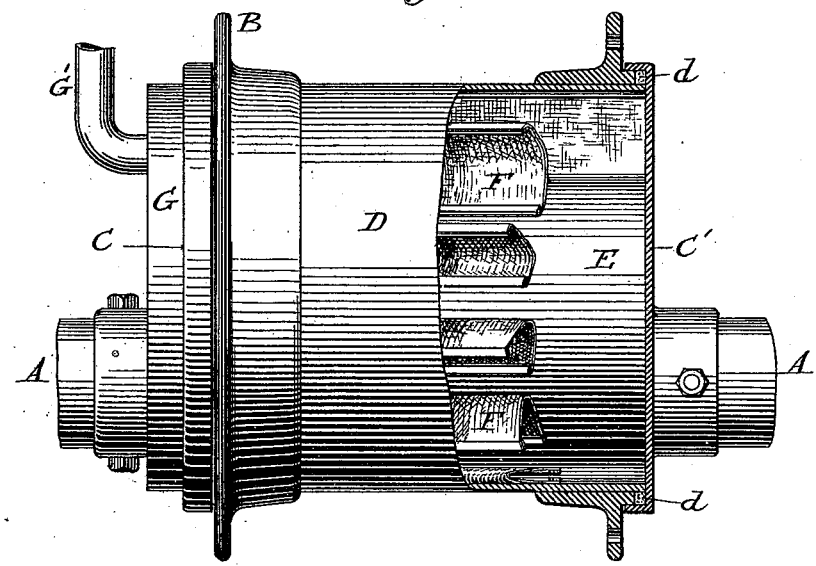
Figure 4:
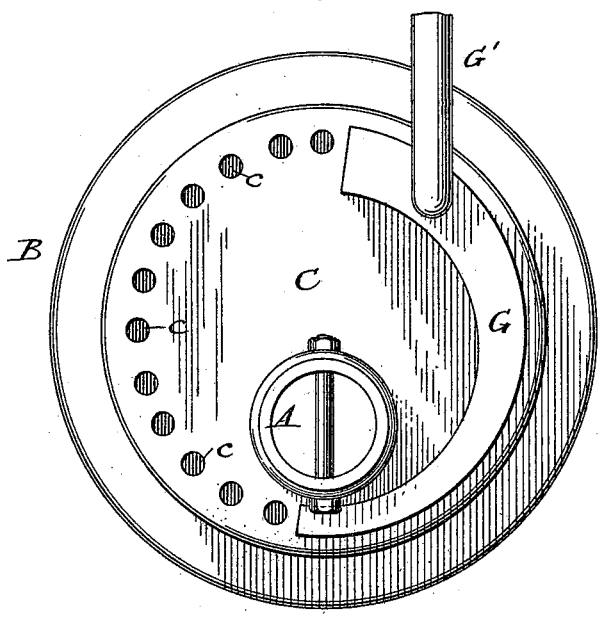
Figure 5:
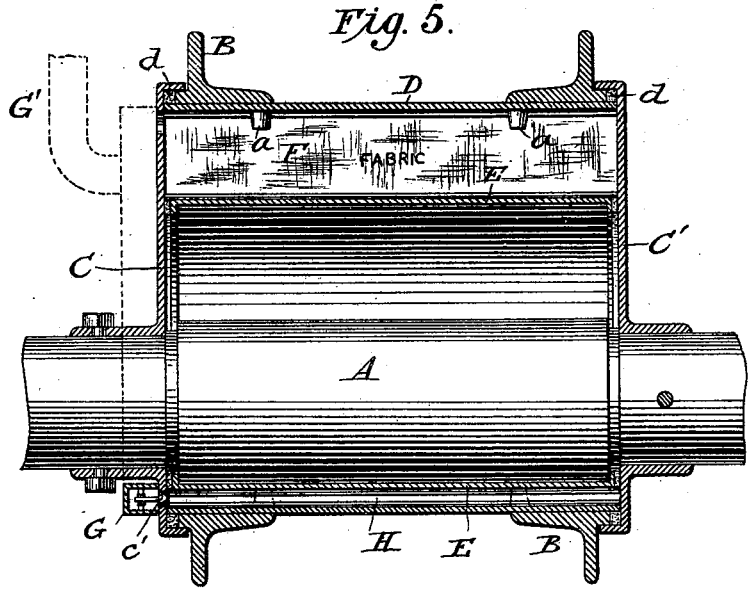
Figure 6:
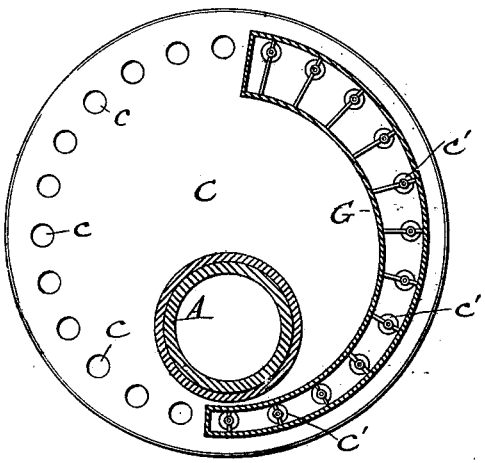
Figure 7:
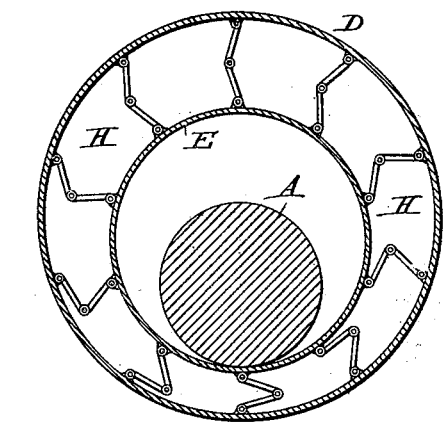

Figure 1 is a sectional elevation of the air-compressor, in which the weight is applied to the axle or shaft, which is the supported part in this instance, and illustrating the invention as adapted to the hubs of the wheels of moving vehicles. Fig. 2 is a similar view of the same, showing the shaft fixed, the wheel being in this instance the supported part. Fig. 3 is a side elevation, partly broken away, of the device. Fig. 4 is an end view. Fig. 5 is a longitudinal section thereof. Fig. 6 is a detail view through the air-collector, and Fig. 7 is a detail view of a modification.

In the drawings, A represents a shaft which may be supported in a journal-bearing—such, for instance, as the hub B of a wheel, as in Fig. 1—or the shaft may support the wheel, as in Fig. 2. On this shaft are eccentrically secured opposite disks or heads C C', which may be closely fitted to the shaft. Rotatably mounted on or between these plates C C' and connected thereto by a suitably-packed air-tight joint d is a cylinder D, which is fixed relatively to the wheel. Within the cylinder D is a second cylinder E, the ends of which are preferably closely fitted in an air-tight manner by properly packed or rubbing joints to the disks C C'. This cylinder E is eccentric to the shaft A and to the cylinder D. The space, therefore, between the cylinders D E and opposite disks C is annular in form and much wider at the top than at the bottom in Fig. 1 and much wider at the bottom than at the top in Fig. 2, the cylinders more nearly contacting at the point where the weight is transmitted from shaft to the wheel or bearing.

Between the cylinders D and E are arranged a number of collapsible partitions F, which may be of any pliable material or of any other preferable construction which will enable the partitions to expand and contract according to the radius of the space between the cylinders D and E as they are rotated around. The edges of these partitions should also be arranged so as to maintain very close joints with the inner faces of the disks C C'. The spaces between the cylinders D E and disks C C' are thus divided by partitions F F into an annular series of air-compressing chambers H.

The disk C' is imperforate; but the disk C is provided with an annular series of perforations c, which communicate with air-chambers H. Half of these perforations c may be provided with inwardly-closing valves c' of any suitable construction, so as to permit the escape of air from the air-chambers H. I do not confine myself to such construction of air-collector, however.

Formed on or closely fitted to disk C over the valved openings c therein is a collecting-tube G, from which the compressed air is conducted by a pipe G' to any desired point. It being understood that the partitions F are collapsible, it will be obvious from an inspection of Figs. 1 and 2 that as the air-chambers H are rotated around or with the shaft A they will be successively reduced in dimensions or cubical area as they pass the point of closest approximation of cylinders D and E. Consequently the air in said chambers will be compressed and expelled therefrom into the collector G, and thence conducted to the point of utilization or storage.

In Fig. 1 the air-chambers are diminished in cubical area as they pass under the shaft, and in Fig. 2 they are diminished in area as they pass over the shaft. In Fig. 1 the compression of air will be due to the weight upon the shaft A when said shaft is supported upon the journals or wheels, and this construction is adapted for use on the wheels of bicycles or other movable vehicles where it is desired to produce and maintain a supply of air. In Fig. 2 the compression of air is practically due to the weight of the wheel upon the shaft A, where the wheel or journal is supported upon the shaft, and this construction is adaptable to the hubs of suspended wheels. In these cases, where the weight on the shaft or upon the wheel is utilized to create the pressure, the inner cylinder E should be freely movable between the disks C C'; but the undue crushing or closing of the partitions may be prevented by providing the cylinders or shafts with projections, as at $a$, which will prevent the cylinders D and E coming too nearly into contact. In this construction it will be seen that no power is wasted in compressing the air, practically no more power being required to propel the vehicle or rotate the shaft or hub to which such air-compressor is attached than it would if such compressor were not present.

If it is desired in some cases, the cylinder E might be guided in fixed relation to the disks; but in such cases the amount of compression of the air would be due to the force exerted to rotate the shaft or wheel in the first instance, and while I consider such construction as embraced in my invention I do not now consider it the preferable form, because of the extra power required.

I have thus illustrated and described two forms of the invention, which will suffice to convey a clear understanding of the principles thereof; but I do not limit myself to the construction shown, as the invention is capable of embodiment in a number of forms and of adaptation in a number of places where air-compressors can be advantageously employed.

Having thus described my invention, what I therefore claim as new, and desire to secure by Letters Patent thereon, is—

1. In an air-compressor, the combination of a pair of disks, eccentrically-disposed cylinders therebetween, and fitted air-tightly thereagainst, and means for rotating the cylinders; with collapsible partitions between the cylinders and the disks, whereby contractible and expansible air-compressing chambers are formed between the cylinders and disks, substantially as described.

2. The combination of a shaft, a pair of disks thereon a pair of inner and outer cylinders eccentric to the shaft and a series of radial collapsible partitions between the cylinders dividing the annular space therebetween into an annular series of contractible and expansible air-chambers, the said outer cylinder having an air-tight joint with the disks, and the inner cylinder having a slidable air-tight joint with the disks, substantially as described.

3. The combination of a shaft, a pair of disks thereon a pair of cylinders eccentric to the shaft closely fitted between said disks, the inner cylinder having a sliding air-tight joint with the disks, a series of collapsible radial partitions between the cylinders forming compressible and expansible air-chambers intermediate the shaft and cylinder, one of said parts being weighted so as to cause the air-chambers to be compressed at the point where the weight is transmitted from one of said parts to the other.

4. The combination of an inner and outer cylinder, a pair of disks closing the ends of said cylinders and readily-collapsible partitions intermediate the said cylinders and disks, dividing the space therebetween into a series of compressible air-chambers, and an air-collector beside one disk provided with valve-inlets to receive the compressed air as the cylinders are rotated; with means for eccentrically displacing one cylinder in relation to the other during the rotation thereof, whereby the said air-chambers are successively reduced in cubical capacity, as they pass the point of closest approximation of the cylinders.

5. The combination of an inner and outer cylinder, a pair of disks closing the ends of said cylinders and readily-collapsible partitions intermediate the said cylinders and disks and dividing the space between the cylinders and disks into a series of compressible air-chambers; the inner cylinder having sliding air-tight joints with the disks and both cylinders being eccentric in relation to each other during the rotation thereof, whereby the said air-chambers are successively reduced in cubical capacity, as they pass the point of closest approximation of the cylinders; the eccentric displacement of the cylinders being produced by weight applied to one cylinder; and means for collecting the compressed air from the several chambers all substantially as described.

In testimony that I claim the foregoing as my own I affix my signature in presence of two witnesses.

CHARLES FRANKLIN DU BOIS.

In presence of—
   JAMES A. KITSON,
   JOHN S. GIBONS.